(12) United States Patent
Shieh

(10) Patent No.: US 6,384,956 B1
(45) Date of Patent: May 7, 2002

(54) ROBUST RESET-FREE POLARIZATION CONTROLLER CONSISTING OF QUARTER-WAVELENGTH PLATES

(75) Inventor: William Shieh, Ocean Township, Monmouth County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/497,074

(22) Filed: Feb. 2, 2000

(51) Int. Cl.[7] .................................................. G02F 1/03
(52) U.S. Cl. ........................................ 359/256; 359/497
(58) Field of Search ............................ 385/11; 359/246, 359/256, 257, 484, 497, 499, 501

(56) References Cited

U.S. PATENT DOCUMENTS 4,772,104 A * 9/1988 Buhrer ....................... 359/497
5,212,743 A 5/1993 Heismann ..................... 385/11

OTHER PUBLICATIONS

H. Shimizu, Endless Polarization Controller Using Electro–Optic Waveplates, *Electronic Letter*, vol. 24, No. 7, Mar. 31, 1998.

* cited by examiner

*Primary Examiner*—Georgia Epps
*Assistant Examiner*—Evelyn A. Lester
(74) *Attorney, Agent, or Firm*—Gibbons Del Deo Dolan Griffinger & Vecchione

(57) ABSTRACT

A reset-free polarization controller is presented for maintaining the polarization of an incident optical signal at a fixed and known value. At least 3 controllable quarter-wavelength plates are connected in cascade to an incident optical source having a variable polarization. Each quarter-wavelength plates varies the orientation of phase retardation along the optical wavepath. The dynamic realignment of the cascaded quarter-wavelength plates with respect to the varying input polarization maintains the polarization of the output optical signal at a fixed and known value.

26 Claims, 6 Drawing Sheets

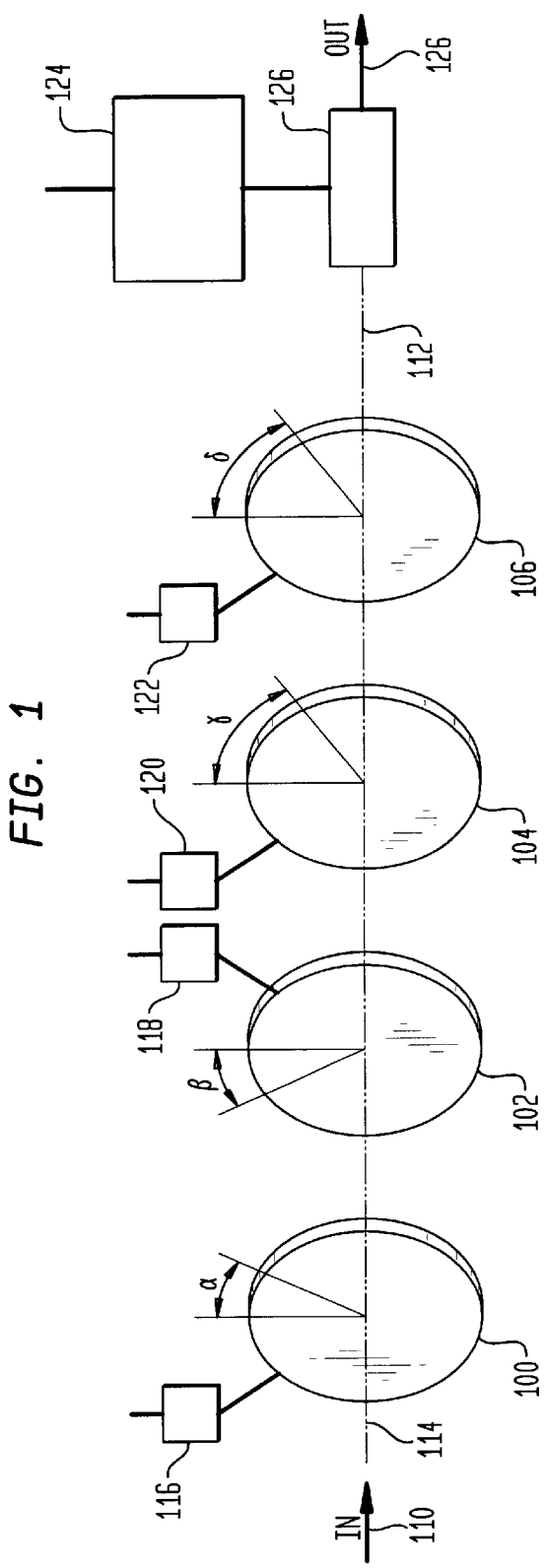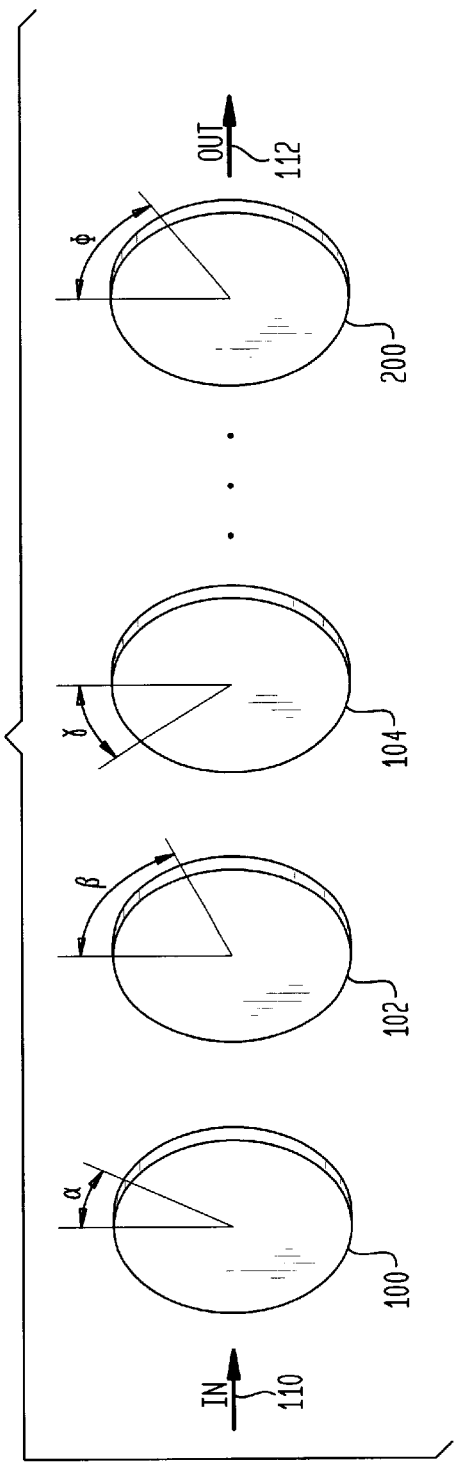

ROBUST RESET-FREE POLARIZATION CONTROLLER CONSISTING OF QUARTER-WAVELENGTH PLATES

FIELD OF THE INVENTION

This invention pertains to the field of optical communication systems. More specifically, this invention is related to controlling the polarization of optical signals.

BACKGROUND OF THE INVENTION

As is known in the art, the performance of optical devices such as tunable filters, optical amplifiers, modulators and receivers are all adversely affected by changes in the polarization of the incident optical signal. For example, in coherent optical receivers, the field intensity of the detected signal is directly proportional to the cosine of the phase difference between the input optical signal and local optical source. Accordingly, when the polarization of the signal and local source are in-phase, the field intensity of the detected signal is at a maximum value. However, when the polarization of the signal and source are orthogonally oriented—i.e., 90 degrees out-of-phase, the detected signal field intensity is reduced to a zero level. Such losses in signal strength are detrimental to the performance of optical systems. Thus, maintaining a fixed and known state of polarization (SOP) of an incident optical signal with respect to the SOP of the local optical source is a problem that must be continuously solved to maintain acceptable performance in optical communication systems.

Methods of matching the SOP between two light sources are known in the art. Polarization controllers are one method used to adjust the polarization of an input optical signal to an arbitrarily set fixed and known output value regardless of the input polarization. An integrated polarization controller using a quarter-wavelength and a half-wavelength plate to provide a fixed polarization output for a varying optical input is disclosed in H. Shimizu, Endless Polarization Controller Using Electro-Optic Waveplates, *Electronic Letter*, Vol. 24, No. 7, Mar. 31, 1988. A second method of controlling polarization is disclosed in U.S. Pat. No. 5,212,743, Automatic Polarization Controller Having Broadband Reset-Free Operation, to Heismann. Heisman discloses a half wavelength plate (HWP) is interposed between two quarter-wavelength plates (QWP) to provide a fixed and known polarization output for a varying input signal polarization. In this method, the two outer quarter-wavelength plates are synchronized such that there is fixed angular difference between the two outer plates. That is, a change in orientation of one outer QWP causes a corresponding change in the other QWP.

Experimentation has shown that current polarization controllers fail to provide adequate compensation for rapidly changing input polarization. Such failure to compensate for a varying input polarization is typically caused by the controller losing track of the input optical signal. Such loss of tracking lock, known in the art as "trapping," typically causes a reduction in the signal power of the optical signal in the desired polarization. In cases, the loss in power may exceed 30 percent. As would be understood, such levels of power reduction are detrimental to the performance of optical components that depend upon a fixed and known SOP. For example, in a coherent optical receiver, a loss of 30 percent of the input signal may cause the signal-to-noise ratio of a detected signal to be reduced to such a low level that the optical signal may not be properly decoded.

Further, polarization controllers using an HWP are harder to characterize, contain more distortion, and are less reliable than those using QWPs. This is primarily because the HWP is twice the length of the QWP.

Accordingly, there is a need to provide for improved stabilization of the polarization of optical signals in response to a varying input polarization in order to reduce the number and magnitude of trapping occurrences.

SUMMARY OF THE INVENTION

The present invention is an apparatus for improving the control and stabilization of the polarization of an optical signal that varies as the optical signal traverses an optical media such as a fiber-optic cable. By cascading a plurality of quarter-wavelength plate elements and dynamically adjusting the eigenaxis of the quarter-wavelength plate elements in relation to the polarization of a received optical signal, the polarization of a received optical signal may be maintained substantially fixed with fewer occurrences of loss of lock and reduced depth of trapping.

In an exemplary embodiment of the invention a plurality of electro-optical quarter-wavelength plate elements are cascaded together on a low birefringence optical medium. The phase delay introduced by the quarter-wavelength plate elements causes variations in the birefringence of the optical medium that alters the polarization of the incident optical signal. By dynamically adjusting the eigne axis the quarter-wavelength plate elements in response to changes in polarization of an incident optical signal, an arbitrarily set fixed and known polarization of the output optical signal may be maintained.

BRIEF DESCRIPTION OF THE FIGURES

The advantages, nature and various additional features of the invention will appear more fully upon consideration of the illustrative embodiments to be described in detail in connection with the accompanying drawings. In the drawings:

FIG. 1 illustrates a simplified diagram of the combination of four fractional quarter-wavelength plate elements in accordance with one embodiment of the invention;

FIG. 2 illustrates a simplified diagram of the combination of N fractional quarter-wavelength plate elements in accordance with a second embodiment of the invention;

Figure 3:
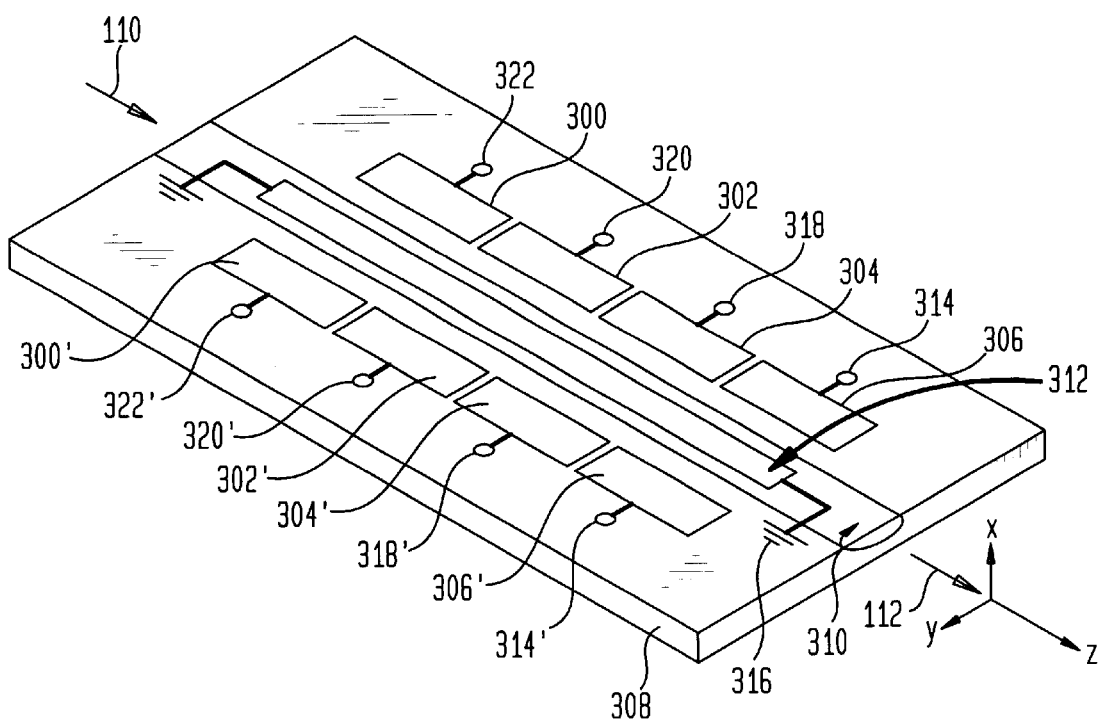
FIG. 3 illustrates a waveguide and electro-optic structure of a 4-QWP in accordance with the invention claimed.

It is to be understood that these drawings are for purposes of illustrating the concepts of the invention. It will be appreciated that the same reference numerals, possibly supplemented with reference characters where appropriate, have been used throughout the figures to identify corresponding parts.

DETAILED DESCRIPTION OF THE INVENTION.

FIGS. 1 through 7 and the accompanying detailed description contained herein are to be used as illustrative examples of exemplary embodiments of the present invention and should not be construed as the only manner of practicing the invention.

Referring to FIG. 1 there is illustrated a simplified embodiment of a bulk optical polarization controller. In the shown embodiment, four (4) quarter-wavelength plate (QWP) elements 100, 102, 104 106 are cascaded together and are angularly rotatable about axis 114. Axis 114 is parallel to the direction of the incident optical signal 110. As is known, quarter-wavelength plate elements linearly phase retard the input polarization of an incident optical source by substantially $\pi/2$ degrees. Thus, a desired output polarization may be achieved by rotating each cascaded QWP about axis 114 with respect to one another.

In the exemplary embodiment illustrated in FIG. 1, QWP 100, 102, 104 106 are set at angles $\alpha$, $\beta$, $\gamma$ and $\delta$ degrees, respectively, with respect to an arbitrarily chosen vertical reference axis. In the illustrated embodiment, the angles, $\alpha$, $\beta$, $\gamma$, and $\delta$ are each independently adjustable and determinable. The combination of the $\pi/2$ phase retardation introduced by each QWP and the orientation of each QWP (i.e., angles $\alpha$, $\beta$, $\gamma$, and $\delta$) contributes to setting the polarization of output signal 112. Therefore, to achieve a desired fixed and known SOP for output signal 112 for an incident optical signal 110, an appropriate alignment of the phase retardation of QWP 100, 102, 104 106 is necessary.

One method of determining the orientation of QWP 100, 102, 104 106 necessary to obtain a fixed and known polarization of output signal 112 is by dithering each QWP about a nominal reference angle until a peak power output is achieved. FIG. 1 shows a typical feedback mechanism used to control the orientation of the cascaded QWP with regard to setting, for example, the angles $\alpha$, $\beta$, $\gamma$, and $\delta$. Typically, output signal 112 is applied to optical tap 126 from which a minor percentage of optical power of output signal 112 is tapped off and applied to sensor/controller 124. Sensor/controller 124 measures the tapped-off optical power. When the measured power is less than a peak power level, control signals are provided to adjusting means 116, 118, 120,122. Adjusting device 116, 118, 120, 122 then cause corresponding QWP elements to be rotated about axis 114. Adjusting devices such as a servo-motor may be used to cause the illustrated bulk-optical plates to vary about a reference position. In the illustrated example, QWP 100 is alternately rotated (dithered) about a nominal reference angle (e.g., $\alpha$) by adjusting device 116. During this period of adjustment, the tapped power level of output signal 112 is continuously measured by sensor 124. QWP 100 is then to set at that angle that produces a peak power output. Similarly, QWP 102 may then be alternately adjusted (dithered) about a nominal reference angle (e.g., $\beta$) by adjusting device 118. During this period of adjustment (dithering), the tapped power level of output signal 112 is measured by sensor 124. QWP 102 is then be set to that angle that produces a peak power output. This adjustment process is then performed on QWP 104 and then on QWP106. The entire process is continuously repeated until a peak output is achieved for optical signal 112.

When determining the correct alignment of reference angles, the dithering of each QWP may occur in time slots that are sequential and mutually exclusive. In the previously discussed method one QWP is adjusted to produce a first peak power output, then the next QWP is adjusted to produce a second peak power output. This process continues until the peak achievable power is obtained. In a second method of determining the reference angles, the dithering of each QWF may occur simultaneously such that each QWP is adjusted during a single time slot. Other methods of adjusting the angles of each QWP are also known in the art and need not be discussed herein.

In a generalized embodiment, in accordance with the underlying principles of the invention, N quarter-wavelength plate elements (N-QWP) may be cascaded together to adjust the polarization of output signal 112 to a fixed and known polarization. An example of a bulk optical N-QWP polarization controller is illustrated in FIG. 2. In this embodiment, each QWP rotates to a reference angle value such that the polarization of output signal 112 is set to a fixed and known value. In the illustrated embodiment, each QWT is adjusted independently of other QWPs. However, it would also be understood that the angular offset between a plurality of plates may be fixed. That is, two QWP may be synchronized such that the setting of one QWP would also adjust the setting of other QWP elements. The number and angular offset of such synchronized plates may be determined as a function of the number of QWP within the polarization controller.

As would be known in the art, the bulk electromechanical devices illustrated are not reset-free. That is, the waveplates are not capable of being driven continuously. As the waveplates rotate, a limit is reached that requires the drive mechanism to be reset. This reset causes a significant loss in the tracking of the polarization.

A practical integrated electro-optic realization of the present invention that is reset-free containing four QWPs is illustrated in FIG. 3. In this embodiment, the polarization controller is fabricated on a low birefringence material substrate 308, such as $LiNbO_3$, and operated with a standard titanium-indiffused, single mode waveguide 312. Four cascaded electro-optic elements, 300–300', 302–302', 304–304', 306–306' are created on the low birefringence material substrate. In this embodiment of the invention, by adjusting the voltage across the electro-optical elements, a known alteration of the material birefringence may be established. This alteration of the material birefringence may be used in a similar manner as the adjustment of reference angles and phase referred to in FIG. 1. Accordingly, by adjusting the voltage across the electro-optic elements, the state of polarization of input optical signal 110 may be altered to produce a fixed and known SOP for output signal 112.

In the illustrated embodiment, each cascaded electro-optic QWP induces an adjustable combination of phase shift and TE-TM mode conversion in the passing optical signal. As is known in the art, phase shifting occurs by applying a voltage difference to the opposing plates of an electro-optical element. Further, TE-TM mode conversion occurs by applying a common voltage to an electro-optical element. The application of a combination of voltage difference and common voltage to the opposing plates of an electro-optical element alters the birefringent axis of the electro-optical element. Thus, the polarization of output signal 112 may then be controlled by varying the drive voltage across respective electro-optic elements. Variation of the voltages across respective wavelength-plates to achieve desired orientation of the birefringence axis is well known in the art and need not be discussed in detail herein.

Figure 4:
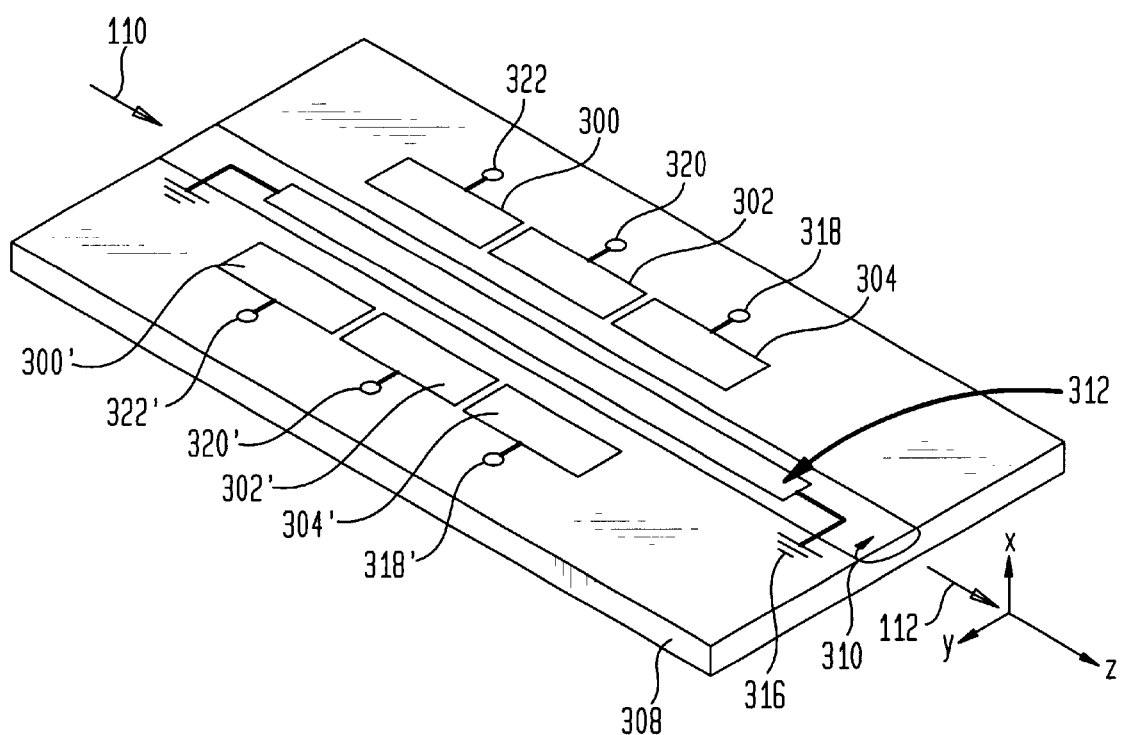
FIG. 4 illustrates a waveguide and electro-optic structure of a 3-QWP in accordance with the invention claimed.

A second embodiment of a polarization controller is depicted in FIG. 4. Similar to the embodiment depicted in FIG. 3, a polarization controller is fabricated on a low birefringence material substrate 308 and operated with a standard titanium-indiffused, single mode waveguide 312. In this embodiment three cascaded electrooptic elements 300–300', 302–302', 304–304' corresponding to three rotatable quarter-wavelength plates are used in controlling the polarization of output signal 112.

As would be understood, the underlying principles of the invention allows for polarization controllers to be created that include any number of cascaded electro-optic QWPs elements, similar to the N-QWP polarization controller illustrated in FIG. 2. Furthermore, the precise phase shifting capability of a selected QWP discussed herein is nominally set at π/2 degrees. However, experimentation has shown that overdriving the phase shift—i.e., phase shifts greater than 90 degrees, achieves a response that is more robust than electro-optical devices with a phase shift equal to π/2. Thus the scope of the present invention is not intended to be limited to elements solely of phase shift π/2, but, rather includes elements with phase shifts within a range centered about π/2.

Figure 5:
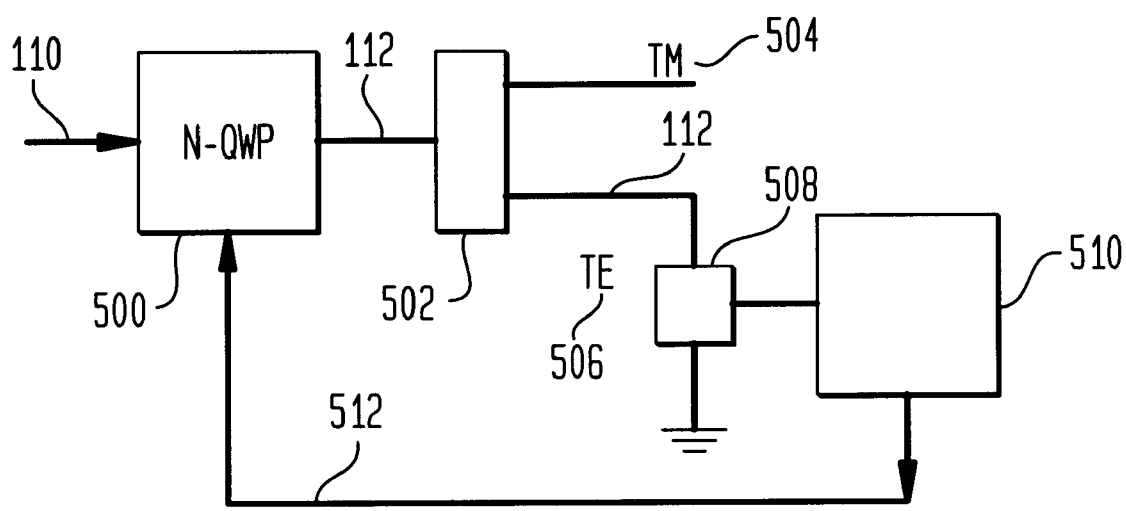
FIG. 5 illustrates a block diagram of a system for testing that may be used to determine the performance characteristics of a polarization controller.

Illustrated in FIG. 5 is a system used for testing the effectiveness of polarization controller 500 in maintaining a fixed and known state of polarization for output signal 112. In this system of testing, incident optical signal 110, with a fixed SOP, is input into polarization controller 500. After polarization adjustment by controller 500, output signal 112 has a fixed and known state of polarization. Output signal 112 is then applied to polarization splitter 502, which splits output signal 112 into a TM component 504 and a TE component 506. When fixed and known polarization of output signal 112 matches the SOP of polarization splitter 502, the optical energy measured in TE component 504 is at a peak value—i.e., 100 percent. On the other hand, when the SOP of output signal 112 is not the fixed and known desired value, then some portion of the optical energy is contained in TM component 506 and a reduced amount of energy is contained in TE component 504.

TE component 504 is then applied to photo-detector 508, which converts the incident optical power in TE component 504 into an electrical form for measurement by measurement device 510. Measurement device 510 may be any device for recording the changes in power level by monitoring a corresponding voltage or current. Measurement device 510 may be, for example, an oscilloscope or graphic recorder or digital recorder.

In the testing system described in FIG. 3, a change in polarization of input signal 110 would cause a change in the polarization of output signal 112. The changed polarization of output signal 112 then does not match the polarization of splitter 502 and, accordingly, the power of TE component 504 is also reduced. Measurement device 510 then detects this reduced power level in the TE component 504 and using the reduced power level formulates control signal 512. Control signal 512 is provided to polarization controller 500 to adjust the orientation of the eigenaxis of the electro-optic elements. In the electro-optic embodiment of the invention as shown in FIG. 3, polarization controller 500 in response to signal 512 varies the voltage across each electro-optic QWP element to alter the birefringence along the wavepath. Similar to the dither described in regard to FIG. 1, the voltages across each electro-optic QWP are varied until peak TE power level is again achieved. When peak TE power level is again sensed by measurement device 510, the adjustment of the drive voltages is discontinued.

Trapping occurs during the time the electro-optic elements are being brought into alignment to change the polarization of input signal 110 to a desired fixed and known output value. In such cases, the polarization of input optical signal 110 may have changed significantly in a short period of time. In response, either a larger dither of each QWP about a reference angle may be necessary, or a change in the nominal reference angle of one or more QWPs may be required. During these periods of QWP adjustment the polarization of output signal 112 is not the fixed and known desired value and the power output may be significantly reduced.

By monitoring and measuring TE component 504 over time, both the degree and frequency of trappings that occur may be determined as polarization controller 500 responds to an optical signal having a varying state of polarization.

Figure 6A:
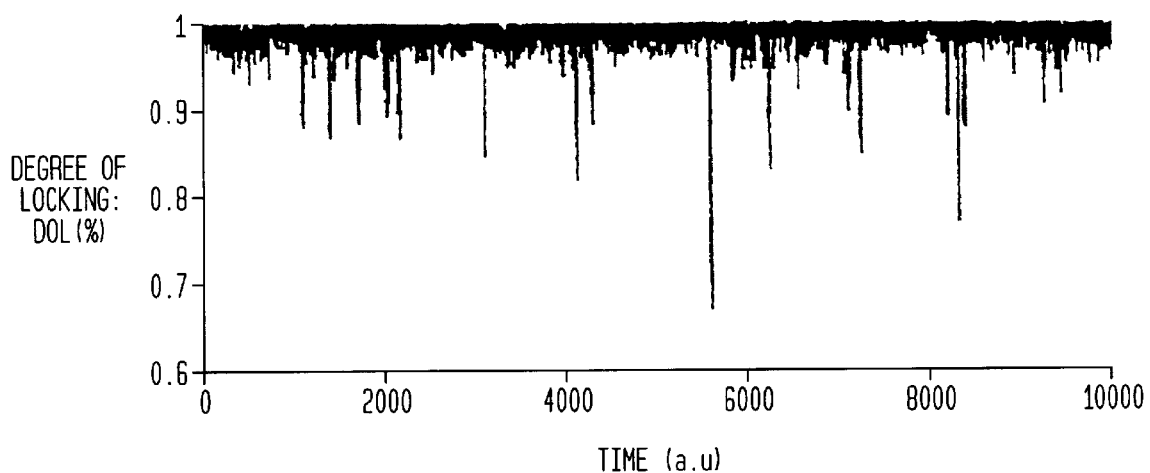
FIG. 6a illustrates the tracking performance of a typical prior art polarization controller.
Figure 6B:
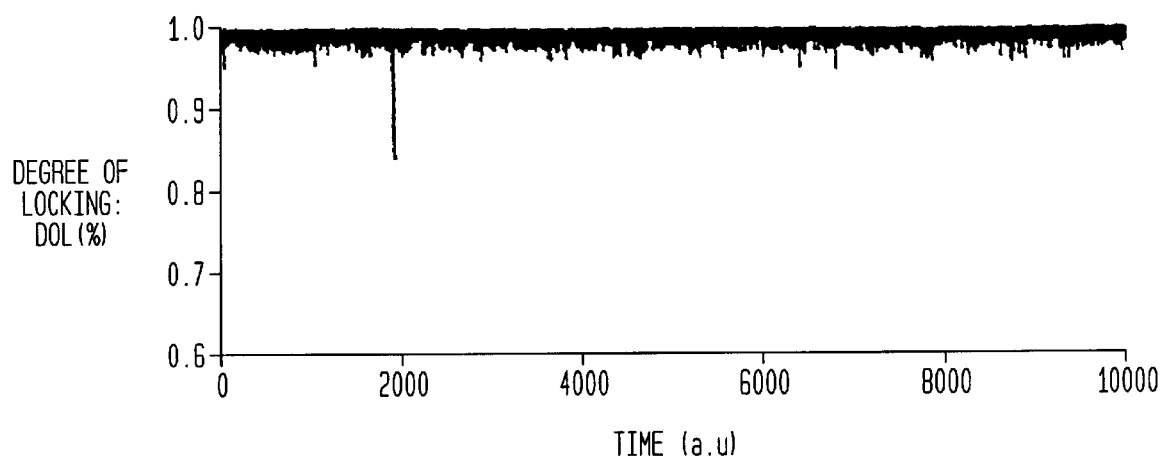
FIG. 6b illustrates the tracking performance of one embodiment of the invention.
Figure 6C:
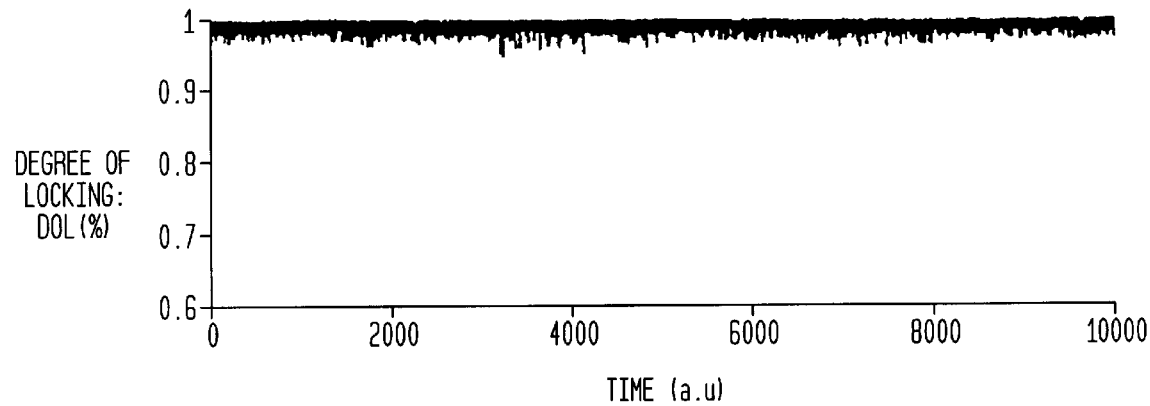
FIG. 6c illustrates the tracking performance of a second embodiment of the invention.

FIGS. 6a, 6b and 6c illustrate simulated results of trapping that occurs in polarization controllers known in the prior art and two (2) different embodiments of the present invention. In the illustrated cases presented, the polarization of input signal 110 is randomly changed by 5 degrees per unit of time. To normalize the results, the degree of lock is defined as the ratio of the power in the TE component to the total power.

FIG. 6a illustrates, the simulated TE 504 power for a prior art polarization controller consisting of a QWP/HWP/QWP, as typified by the device shown in U.S. Pat. No. : 5,212,743 to Heisman, which was previously discussed. As illustrated, numerous occurrences of trapping are detected, as represented by the decrease in the power level of TE component 504. Power losses exceeding 10% are typical and a loss in excess of 30% is observed.

Referring now to FIG. 6b, the simulated power level of TE component 504 using a polarization controller containing 4-QWPs in accordance with the invention is illustrated. As can be seen, the number of occurrences and the magnitude of the trappings, as represented by the decrease in power level, are significantly reduced compared to the prior art QWP/HWP/QWP controller. In this embodiment of the invention, there is only one occurrence of trapping in which the power loss exceeds 10 percent.

FIG. 6c illustrates the simulated power level of TE component 504 using a polarization controller containing 5-QWPs, in accordance with the invention. As illustrated, the performance of this controller exhibits a considerably improved performance over that of the prior art controller. In this embodiment of the invention no significant occurrence of trapping are observed. In fact, the power level of TE component 504 remains substantially constant indicating that the state of polarization of output signal 112 remains substantially fixed regardless of the change in polarization of optical signal 110.

Figure 7:
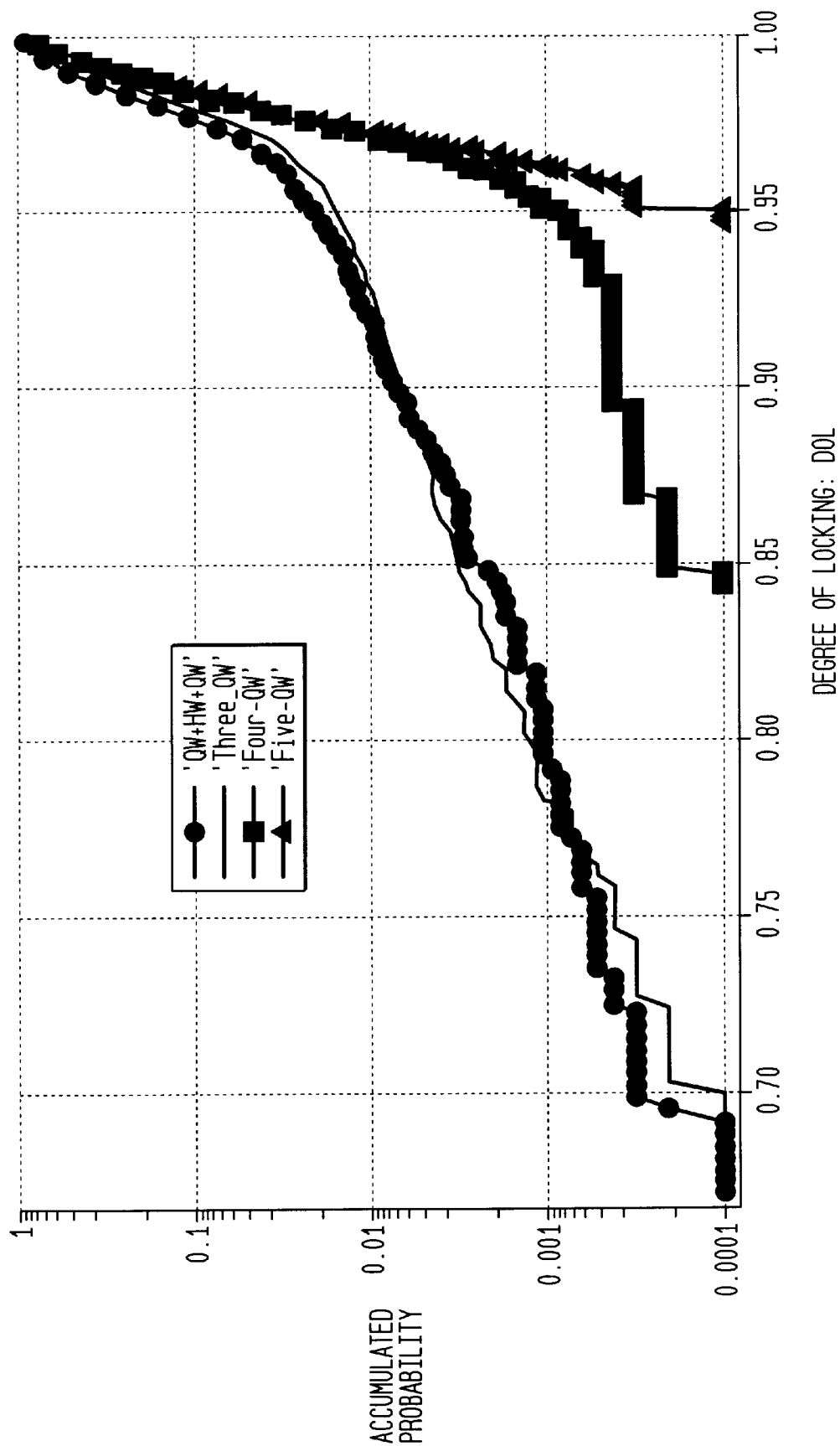
FIG. 7 illustrates trapping performance of the prior art and of different embodiments of the invention.

FIG. 7 shows a chart of the cumulative probability of a trapping occurring in a prior art QWP/HWP/QWP controller and in three (3) controllers made in accordance with the invention are illustrated.

As is shown, the prior art QWP/HWP/QWP polarization controller has a probability of 0.008 of a trapping occurring that will cause at least a 10% reduction in the output power level. That is, the measured power level falls below 90% the peak measured power.

FIG. 7 also shows a polarization controller using 3-QWP elements, in accordance with the present invention, exhibits performance that is similar to that of the prior art QWP/HWP/QWP polarization controller. Although there is similar performance with regard to trapping, a 3-QWP element polarization controller, as previously discussed, is advantageous over the prior art QWP/HWP/QWP controller as it is smaller in size, contains less distortion and easier to characterize. In another embodiment of the invention, consisting of 4-QWP elements, the probability of a trapping occurring that would cause a reduction in power of 10 percent is considerable less than that of the QWP/HWP/QWP prior art controller. In this case, the probability is 0.0004 that a trapping would cause a 10% percent reduction in the power level. This is an order of magnitude better than the performance of the prior art controller.

FIG. 7 further shows that a polarization controller, consisting of 5-QWP elements, has no measurable occurrences of reducing the output power by 10 percent. In fact, this polarization controller exhibits a probability of a trapping occurring of less than 0.0001 that would cause a reduction in power of 5 percent. That is, the output power level remains substantially greater than 95% of the peak power for all changes in the input polarization. Thus, as can be seen, as the number of QWP increases, the stability of the state of polarization of output signal 112 also increases.

Accordingly, the performance of polarization controllers using only QWPs in accordance with the present invention provide significant performance improvement in the stabilization of the polarization output over currently available polarization controllers.

A novel apparatus has been disclosed that dynamically adjusts and controls the polarization of an optical signal transmitted through an optical media. The apparatus uses a series of cascaded quarter-wavelength plate elements that are able to maintain a substantially constant polarization output value for a varying state of polarization of an incident optical signal with fewer occurrences of trappings.

Numerous modifications and alternative embodiments of the claimed invention will be apparent to those skilled in the art in view of the foregoing description. The examples given herein are presented to enable those skilled in the art to more clearly understand and practice the invention claimed. The examples should not be considered as limitations upon the scope of the invention, but as merely representative of the use of the invention. Accordingly, this description is to be construed as illustrative only and is for the purpose of teaching those skilled in the art the best mode of carrying out the invention and is not intended to illustrate all possible forms thereof. It is also understood that the words used are words of description rather that limitation. Details of the structure may be varied substantially without departing from the spirit of the invention and the exclusive use of all modifications which come within the scope of the appended claims is reserved.

What is claimed is:

1. An apparatus for controlling polarization and phase of an optical signal propagating in an optical media having an induced birefringence at a known wavelength of operation, comprising:
    a plurality of optical elements operative to vary said linear birefringence wherein said optical elements are cascaded in series on a communication axis, each of said elements introducing a known phase retardation substantially equal to $\pi/2$ radians; and
    control means coupled to said plurality of cascaded elements to orient said phase retardation of each said element in response to a change in polarization of said optical signal to induce a birefringence to maintain a substantially fixed and known polarization for said optical signal.

2. The apparatus as recited in claim 1 wherein said cascaded elements are bulk optical quarter-wavelength plate elements operable to be angularly rotated with respect to an incident optical signal normal to said quarter-wavelength plates.

3. The apparatus as recited in claim 2 wherein the number of said quarter-wavelength plate elements is at least three.

4. The apparatus as recited in claim 1 wherein said cascaded elements are electro-optic quarter-wavelength plate elements having an electrically controllable birefringence.

5. The apparatus as recited in claim 4 wherein the number of said quarter-wavelength plate elements is at least three.

6. The apparatus as recited in claim 1 wherein said control means further comprises means for adjusting the orientation of said phase retardation in each of said cascaded elements.

7. The apparatus as recited in claim 6 wherein said adjusting of each of said cascaded elements is performed independently.

8. The apparatus as recited in claim 7 wherein each of said cascaded elements is adjusted in a prefixed time slot.

9. The apparatus as recited in claim 8 wherein said time slots are mutually exclusive.

10. The apparatus as recited in claim 8 wherein said time slots are overlapping.

11. The apparatus as recited in claim 6 wherein said control means causes an angular rotation of each of said cascaded elements.

12. The apparatus as recited in claim 6 wherein said control means causes an electrical variation across each of said cascaded elements.

13. The apparatus as recited in claim 6 wherein said adjustment is performed by dithering about a reference point.

14. The apparatus as recited in claim 1 wherein said phase retardation is in a range extending 40 percent about $\pi/2$ radians.

15. A polarization controller for controlling polarization and phase of an optical signal propagating along a wavepath, the polarization controller comprising:
    a plurality of quarter-wavelength plate elements disposed in cascade on a communication axis, each quarter-wavelength plate element introducing a phase retardation of substantially $\pi/2$ radians; and
    control means coupled to said plurality of quarter-wavelength plate elements wherein said control means varies the orientation of said quarter-wavelength plate elements to alter the linear birefringence of said wavepath in response to a change in polarization of said optical signal wherein a substantially fixed and known polarization and phase of said optical signal is maintained.

16. The polarization controller as recited in claim 15 wherein said cascaded components are bulk optical quarter-wavelength plates operable to be angularly rotated with respect to an incident optical signal normal to said quarter-wavelength plates.

17. The polarization controller as recited in claim 15 wherein said cascaded components are electro-optic quarter-wavelength plate elements having an electrically controllable birefringence.

18. The polarization controller as recited in claim 15 wherein said control means further comprises means for adjusting the orientation of phase retardation in each said quarter-wavelength plate element.

19. The polarization controller as recited in claim 18 wherein said adjustment of each said quarter-wavelength plate element is performed independently.

20. The polarization controller as recited in claim 19 wherein each said element is adjusted within a known time slot.

21. The polarization controller as recited in claim 20 wherein said time slots are mutually exclusive.

22. The polarization controller as recited in claim 20 wherein said time slots are overlapping.

23. The polarization controller as recited in claim 18 wherein said control means is operable to induce an angular rotation in each said quarter wavelength plate element.

24. The polarization controller as recited in claim 18 wherein said control means is operable to induce an electrical variation across each said quarter wavelength plate element.

25. The polarization controller as recited in claim 18 wherein said adjustment is performed by dithering about a reference point.

26. The apparatus as recited in claim 18 wherein said phase retardation is in a range extending 40 percent about $\pi/2$ radians.

* * * * *